(12) United States Patent
Pettit et al.

(10) Patent No.: US 7,664,813 B2
(45) Date of Patent: Feb. 16, 2010

(54) DYNAMIC DATA PRESENTATION

(75) Inventors: Bradley R. Pettit, San Jose, CA (US); Steven J. Falkenburg, Los Altos, CA (US); Ada Y. Chan, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 11/380,897

(22) Filed: Apr. 28, 2006

(65) Prior Publication Data

US 2007/0255811 A1 Nov. 1, 2007

(51) Int. Cl.
G06F 15/16 (2006.01)
(52) U.S. Cl. ........................ 709/203; 709/217; 709/224; 715/234; 715/738
(58) Field of Classification Search ................. 709/203, 709/217, 219, 224; 715/234, 738; 707/E17.118
See application file for complete search history.

(56) References Cited

U.S. PATENT DOCUMENTS

| | | | |
|---|---|---|---|
| 5,987,256 A | 11/1999 | Wu et al. | |
| 6,262,729 B1 * | 7/2001 | Marcos et al. | 715/744 |
| 6,286,043 B1 * | 9/2001 | Cuomo et al. | 709/223 |
| 6,411,950 B1 | 6/2002 | Moricz | |
| 6,601,108 B1 | 7/2003 | Marmor | |
| 6,704,024 B2 | 3/2004 | Robotham et al. | |
| 6,725,424 B1 | 4/2004 | Schwerdtfeger et al. | |
| 7,047,318 B1 * | 5/2006 | Svedloff | 709/246 |
| 7,174,506 B1 * | 2/2007 | Dunsmoir et al. | 715/207 |
| 2003/0055816 A1 | 3/2003 | Paine et al. | |
| 2003/0106022 A1 * | 6/2003 | Goodacre et al. | 715/513 |
| 2003/0140118 A1 * | 7/2003 | Lloyd et al. | 709/218 |
| 2004/0187079 A1 * | 9/2004 | Yamada et al. | 715/517 |
| 2008/0016464 A1 * | 1/2008 | Gao et al. | 715/825 |

OTHER PUBLICATIONS

Bos, et al, "Cascading Style Sheets, Level 2, CSS2 Specification", World Wide Web Consortium, May 12, 1998, pp. 1-2, 62-65, 195-200.

MSN TV 2 homepage, provided by MSN TV of Mountain View, CA, available at [[http:www.webtv.com/pc/]], accessed on Nov. 8, 2005, 1 page.

Pocket PC homepage, provided by Microsoft Corporation of Redmond, WA, available at [[http://www.microsoft.com/windowsmobile/pocketpc/ppc/default.mspx]], accessed on Nov. 8, 2005, 2 pages.

(Continued)

*Primary Examiner*—Lashonda T Jacobs
(74) *Attorney, Agent, or Firm*—Lee & Hayes, PLLC (57) ABSTRACT

Dynamic data presentation is described. In an embodiment, drawing instructions are captured as a template at a content provider, and the drawing instructions template is communicated to the computing-based client device that processes the drawing instructions to render a presentation layout in which the dynamic data can be displayed. In another embodiment, content is received at a computing-based client device where the content includes dynamic data and templates that each defines the presentation for a different dynamic data type. The client device determines the type of the dynamic data and selects a template to bind and present the dynamic data for display where the template is selected based on the determined type of the dynamic data. The dynamic data is then rendered for display based on the selected template at the computing-based client device. Subsequent updates to the dynamic data do not require re-downloading the presentation layout of the template.

14 Claims, 8 Drawing Sheets

OTHER PUBLICATIONS

McCain, "Did You Know Pocket IE on Windows Mobile 2003 Supports CSS?" retrived on Aug. 12, 2004 at <<http://blogs.msdn.com/windowsmobile/articles/213771.aspx>>.

Microsoft, homepage HTML source code, retrived on Mar. 14, 2005 at <<http://www.microsoft.com>>.

Mozilla, ncCSSStyleSheet.cpp, retrived on Feb. 27, 2005 at <<ftp://ftp.mozilla.org/pub/firfox/releases/1.0.1/>>.

Mozilla, nsEventStateManager.cpp, retrived on Feb. 27, 2005, at <<ftp://ftp.mozilla.org/pub/firefox/releases/1.0.1/>>.

W3c Working Group on Cascading Style, "1 About the CSS2 Specification".

Wikipedia, Internet Explorer Mobile, retrived on Jul. 22, 2008 at <<http://en.wikipedia.org/wiki/Internet_Explorer_Mobile>>.

Anderson et al., "Scalable Vector Graphics (SVG) 1.1 Specification", World Wide Web Consortium, Jan. 14, 2003, 75 pages.

Nottingham, "Caching Tutorial for Web Authors and Webmasters", Jun. 19, 2000, 12 pages.

* cited by examiner

Fig. 1

```
<div style= "Data-List: true; Data-Path: results/list">          200
    <div style= "Data-Row: Program">
        <span>{Title} begins at </span>
        <span>{Time}</span>
    </div>
    <div style= "Data-Row: Category">
        {CategoryName}
    </div>
    <div style= "Data-Row: Empty">
        <!-- No Content to draw -->
    </div>
</div>
```

Data List "Program List"  202

Row Template "Program"

{Title} begins at {Time}

Row Template "Category"

{CategoryName}

Row Template "Empty"

TV SHOWS  204

*TV Show A* begins at 8:00 pm

*TV Show B* begins at 9:00 pm

MOVIES

*Classic Movie* begins at 10:00 pm

DYNAMIC DATA PRESENTATION

BACKGROUND

A client device can request and access content from server(s) over a network, such as Web-related content via a Web browser application. A browser can forward a request for content over the network to a content source or content provider that then communicates the requested content to the client device. The received content is typically expressed in a markup language format, such as the Hyptertext Markup Language (HTML) format, the Dynamic HTML (DHTML) format, and the like. A tag-based hierarchical structure, such as HTML markup, identifies components in the content and identifies the manner in which the browser should present these components. Dynamic HTML supplements HTML by including information that also governs the behavior of the content, such as by specifying the behavior of a Web page when a user focuses on a link within the Web page. Typically, content authors specify that presentation and behavior using standard web technologies such as Cascading Style Sheets (CSS) and Document Object Model (DOM).

This type of content request and display solution works well for most client devices, such as personal computers, which receive markup content via the Internet. However, this solution does not provide an optimal solution for all types of computing-based client devices. For instance, smaller and/or portable client devices may have reduced resources, such as reduced memory and/or processor-related resources. Examples of such "resource-constrained" client devices include television-based set-top boxes, personal digital assistants (PDAs), mobile telephones, wearable computing devices (e.g., smart watches), and other portable and/or resource-constrained client devices. With such devices, it can be difficult or impossible to duplicate and/or implement the browser components used in a desktop computing environment to receive, process, and render content due to memory limitations, processor limitations, and/or any other resource limitations.

Nevertheless, the above described approach of communicating markup content to a computing-based client device has become entrenched in the industry, and attempts to address the problems of resource-constrained devices do not fundamentally alter this content delivery paradigm. For example, the markup content can be simplified before being communicated to a resource-constrained client device by specifying the content in a more restrictive language, such as XHTML which comprises a more restricted representation of the HTML language using XML. This potentially allows the client device to employ a browser that is correspondingly less complex and which consumes fewer resources compared to its desktop counterpart. However, the client device still operates under the traditional browser paradigm with a simplified browser to receive and render markup language content which is still resource intensive, albeit simplified.

As an alternative to developing content for presentation at a resource-constrained client device using HTML, other approaches can be utilized. For example, an electronic program guide downloaded to a television-based client device can include a list of television programs as well as other display items such as category headers, show times, channel numbers, and the like. To download and display the program guide at the television-based client device, the alternative approaches include writing custom code to display each item type and including the code in the downloaded assembly; including drawing instructions along with each data item in the downloaded data; creating a presentation containing only a portion of the data set, and generating a new page to display a next portion of the data set; or including a bitmap presentation of the data and/or presenting the data in a fixed appearance.

These alternative approaches to rendering content at a resource-constrained client device have various disadvantages. If custom code is written, then authoring content also requires programming. In addition, the writing of custom code to display the data requires not only programming knowledge, but also knowledge of the operating system, graphics libraries, downloaded data structures, and the like. As such, a designer cannot then change the presentation without changing the actual computer code. Including drawing instructions with each data item downloaded to a client device results in large data packages. Including a bitmap presentation of each data item can result in an even larger data set, and also restricts the ability to take advantage of such client-specific features as special color palettes and anti-aliasing of text. Presenting the data using a generic appearance may not allow for customizing the presentation beyond the mere specification of fonts, colors, and positions.

The alternative approaches to rendering content at a resource-constrained client device also preclude responsive updates of dynamic data displayed at the client device, such as a programming list of television programs in the electronic program guide in response to user interaction. In this example, the content provider has to receive the dynamic data update request, re-transcode all of the content to render the program guide with the updated list of television programs, and again communicate all of the content to the television-based client device.

SUMMARY

This summary is provided to introduce simplified concepts of Dynamic Data Presentation which is further described below in the Detailed Description. This summary is not intended to identify essential features of the claimed subject matter, nor is it intended for use in determining the scope of the claimed subject matter.

In an embodiment of dynamic data presentation, content is received at a computing-based client device where the content includes dynamic data and separate templates used for rendering each specific data type. The client device determines a type of the dynamic data and selects a template to bind and present the dynamic data for display where the template is selected based on the determined type of the dynamic data. The dynamic data is then rendered for display based on the selected template at the computing-based client device. The templates only need to be downloaded to the computing-based client device once, and subsequent updates to the dynamic data do not require again receiving the template used for rendering the dynamic data.

In other embodiment(s) of dynamic data presentation, a presentation layout is transcoded at a content provider (server device) to generate a set of drawing instructions which are then communicated to a computing-based client device that processes the drawing instructions to render the presentation layout for display. The drawing instructions can also be captured as a template at the content provider, and the drawing instructions template is then communicated to the computing-based client device that processes the drawing instructions to render the presentation layout. The client device then uses the drawing instructions to render dynamic data for display within the presentation layout. The content provider can receive an update request from the client device to initiate an update of the dynamic data, and the content provider communicates additional dynamic data to the client device which then renders the additional dynamic data for display using the previously received drawing instructions that were generated from the templates.

BRIEF DESCRIPTION OF THE DRAWINGS

The same numbers are used throughout the drawings to reference like features and components.

DETAILED DESCRIPTION

Dynamic data presentation is described in which embodiments provide that a content author at a content provider can design and specify templates for the presentation of dynamic data at a client device, and the content author can specify the origin of the dynamic data using regular HTML authoring without having to write custom code for a resource-constrained (also, "thin") client device to render the dynamic data. The content provider can then communicate or download the dynamic data to the client device which presents the data using an authored appearance.

A "template matching" feature of dynamic data presentation provides that multiple, different templates can be selected to bind and present the dynamic data as it is received at the client device to render each data type differently. The original content specifies a template for each type of data that may be received. Updated data can be received and rendered without having to re-transcode the presentation layout. The template matching feature of dynamic data presentation also provides that two or more different templates can be invoked from one data set for a unified display at a client device.

While aspects of the described systems and methods for dynamic data presentation can be implemented in any number of different computing systems, environments, television-based entertainment systems, and/or configurations, embodiments of dynamic data presentation are described in the context of the following exemplary system architecture(s).

Figure 1:
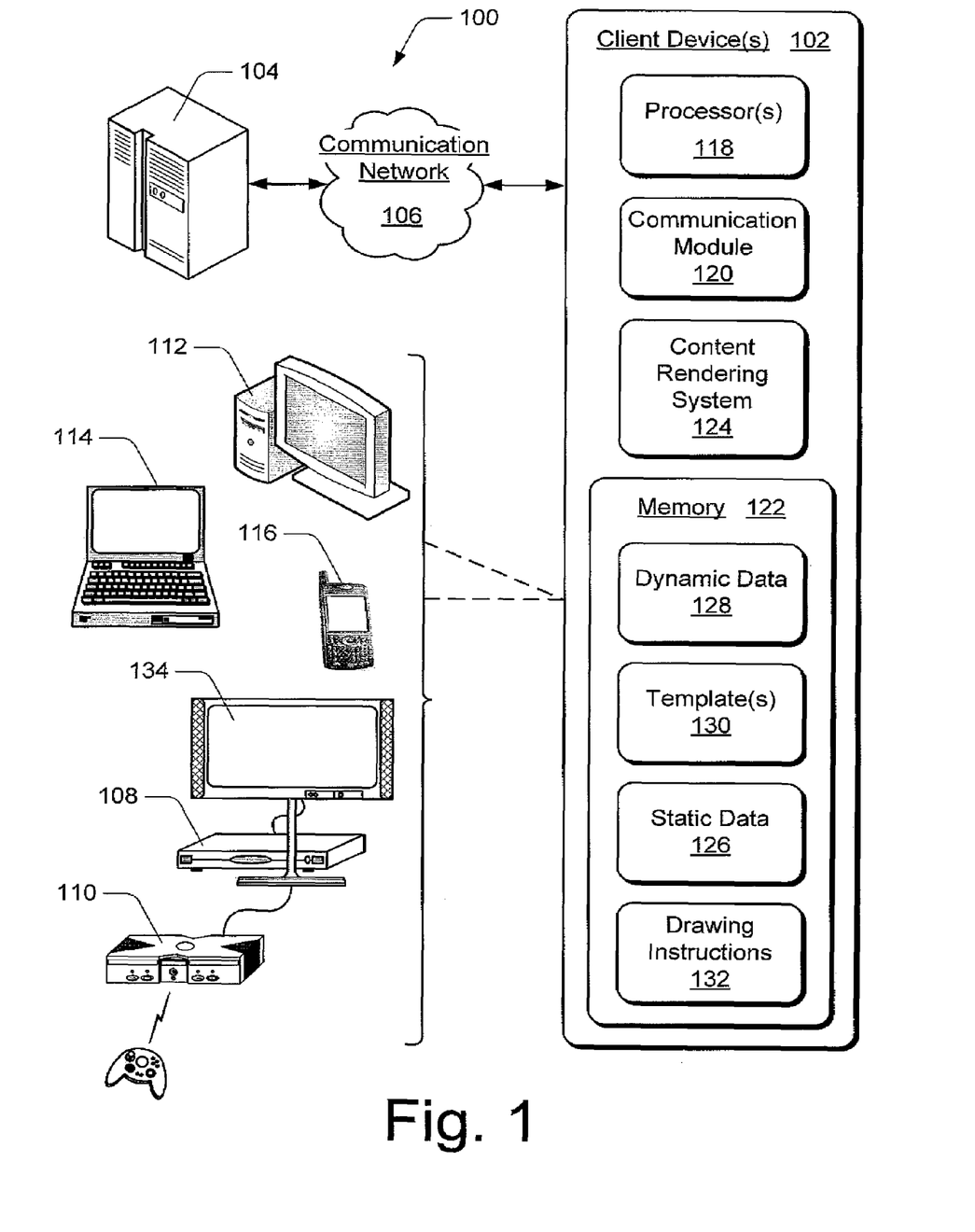
FIG. 1 illustrates an exemplary environment in which embodiments of dynamic data presentation can be implemented.

FIG. 1 illustrates an exemplary environment 100 in which embodiments of dynamic data presentation can be implemented. The environment 100 includes any number of different client device(s) 102 and content provider(s) 104, each of which is configured for communication via a communication network 106. Any of the systems and/or devices can be configured for network access in any number of embodiments and varieties of implementation.

The communication network 106 can be implemented as any one or combination of a wide area network (e.g., the Internet), a local area network (LAN), an intranet, an IP-based network, broadcast network, a public telephone network, a wireless network, or other media content distribution network. Additionally, communication network 106 can be implemented using any type of network topology and any network communication protocol, and can be represented or otherwise implemented as a combination of two or more networks.

A client device 102 can be implemented as any one or combination of a television-based client device 108, a gaming console 110, a desktop computer 112, a portable computer 114, or as any other computing-based device, such as a cell phone 116, a mobile station, a set-top box, a digital video recorder (DVR) and playback system, an appliance device, a gaming system, and/or as any other type of resource-constrained computing-based client device. Thus, a client device 102 can range from full resource devices with substantial memory and processor resources (e.g., personal computers and gaming consoles) to low-resource devices with limited memory and/or processing resources (e.g., traditional set-top boxes and hand-held, portable devices). A client device 102 may also be associated with a user (i.e., a person) and/or an entity that operates a client device such that the client device describes logical clients that include users, software, and/or devices.

In this example, client device 102 includes one or more processor(s) 118, a communication module 120, memory component(s) 122, and a content rendering system 124 which can be implemented as computer executable instructions and executed by the processor(s) 118 to implement embodiments of dynamic data presentation. Additionally, a client device 102 may be implemented with any number and combination of differing components as further described below with reference to the exemplary client device 700 shown in FIG. 7.

Client device 102 receives programs, associated program content, various forms of media content, program guide data, advertising content, and other types of media content from content server(s) of the content provider(s) 104 via the communication network 106. The client device 102 also receives static data 126, dynamic data 128, templates 130, and drawing instructions 132 from the content provider(s) 104 via the communication network 106. In an example of dynamic data presentation, a client device 102 is a resource-constrained, portable computing-based client device that receives and displays email messages. The content rendering system 124 of the portable client device includes an email application to render the received email messages.

In another example of dynamic data presentation, a client device 102 is a resource-constrained television-based client device having little or reduced memory and/or processor-related resources, and optionally does not implement the functionality of a browser application. The content rendering system 124 of the television-based client device includes a program guide application to generate an electronic program guide from which a viewer can navigate through an onscreen display and locate broadcast programs, recorded programs, video on-demand programs and movies, interactive game selections, network-based applications, and other media access information or content of interest to the viewer. The program guide can be displayed on a display device 134 which can be any type of television, LCD, or similar television-based display system that renders audio, video, and/or image data. The television-based client device 108 and display device 134 together are but one example of a television-based client system, examples of which are described with reference to the exemplary IP-based television (IPTV) system 600 shown in FIG. 6, and with reference to the exemplary entertainment and information system 800 shown in FIG. 8.

A display of the electronic program guide at the television-based client device 102 includes static or unchanging features, such as column labels that indicate program broadcast times, row labels that indicate television channel numbers, and the grid structure of the program guide. The display of the program guide also includes a large volume of dynamic, updateable content such as the program listings for television programs and movies that are displayed in the grid of the program guide. As a viewer pages, navigates, and traverses up, down, or across the program guide, the static data 126 such as the grid structure and program broadcast times or television channel numbers may remain unchanged, while the dynamic data 128 such as the program listings displayed in the grid is changing with every viewer navigation input.

In an embodiment of dynamic data presentation, the client device 102 receives the static data 126, the dynamic data 128, and the template(s) 130 from the content provider(s) 104. The template(s) 130 define presentation and behavior of the data that will be received by the client device 102, and are stored in the static data 126. The content rendering system 124 determines a type of the dynamic data, and selects a template 130 to bind and present the dynamic data for display where the template is selected based on the determined type of the dynamic data. The content rendering system 124 then renders the dynamic data for display based on the selected template. In the television-based client device example, a viewer can then initiate an update of the dynamic data, such as the program listings that are displayed in the grid of the program guide. In the example of the portable client device that receives and displays email messages, a user can then input a send/receive command to initiate an update of the dynamic data, such as receiving the text of a new email message that is displayed in an email message template.

The client device 102 (e.g., television-based client device, or portable client device) then communicates the request for the dynamic data update to the content provider(s) 104 via the communication network 106. In response, the content provider(s) 104 download the updated or additional dynamic data to the client device 102 without an additional template to bind and present the additional dynamic data. The additional dynamic data is also provided to the client device 102 without sending the markup for each cell in the data. Only the dynamic data is communicated to update the data display, yet the presentation can be rendered at the client device as if the complete markup for the content was provided. This aspect of dynamic data presentation reduces the network bandwidth requirements.

When the additional dynamic data is received at the client device 102, the content rendering system 124 can render the additional dynamic data for display based on the previously selected template. Alternatively, the content rendering system 124 can determine a type of the additional dynamic data and select a different template to bind and present the additional dynamic data where the different template is selected based on a determined different type of the additional dynamic data. The content rendering system 124 then renders the additional dynamic data for display based on the selected different template.

Also described as "template matching", dynamic data presentation provides that multiple, different templates can be selected to bind and present dynamic data as it is received at the client device 102 to render each data type differently. The original content specifies which template to select for each type of data that is received, and updated data can be received and rendered without having to re-transcode the presentation layout. Dynamic data presentation also provides that two or more different templates can be invoked from one data set for a unified display.

A content author at a content provider 104 can design and specify the template(s) 130 for a presentation and specify the origin of dynamic data using regular HTML authoring without having to write custom code for a resource-constrained (also, "thin") client device to render the dynamic data. The content provider 104 can then communicate or download the dynamic data to the client device 102 which presents the data using an authored appearance. The templates 130 can also include graphical elements other than simply the data to be rendered, and the appearance of the elements when focused or activated can be specified in the content using standard HTML and CSS authoring techniques.

The content author at the content provider 104 can specify in the content the boundaries of a list box and an XPath that specifies the location of the data in relation to a data set. The content author can also specify a template 130 for each type of data to be presented, where each template 130 defines a different dynamic data display type. A template element contains references to specific data fields from each data record in the content. When a list box element is encountered, the drawing operations for each row template are separated from the rest of the page-drawing operations. A separate function is generated from the templates to draw a single list item of any type. When this function is invoked by the content rendering system 124 at the client device 102 to draw a list item, the type of the data is used to branch to select the drawing operations, and the data within the record is rendered for display.

Figure 2:
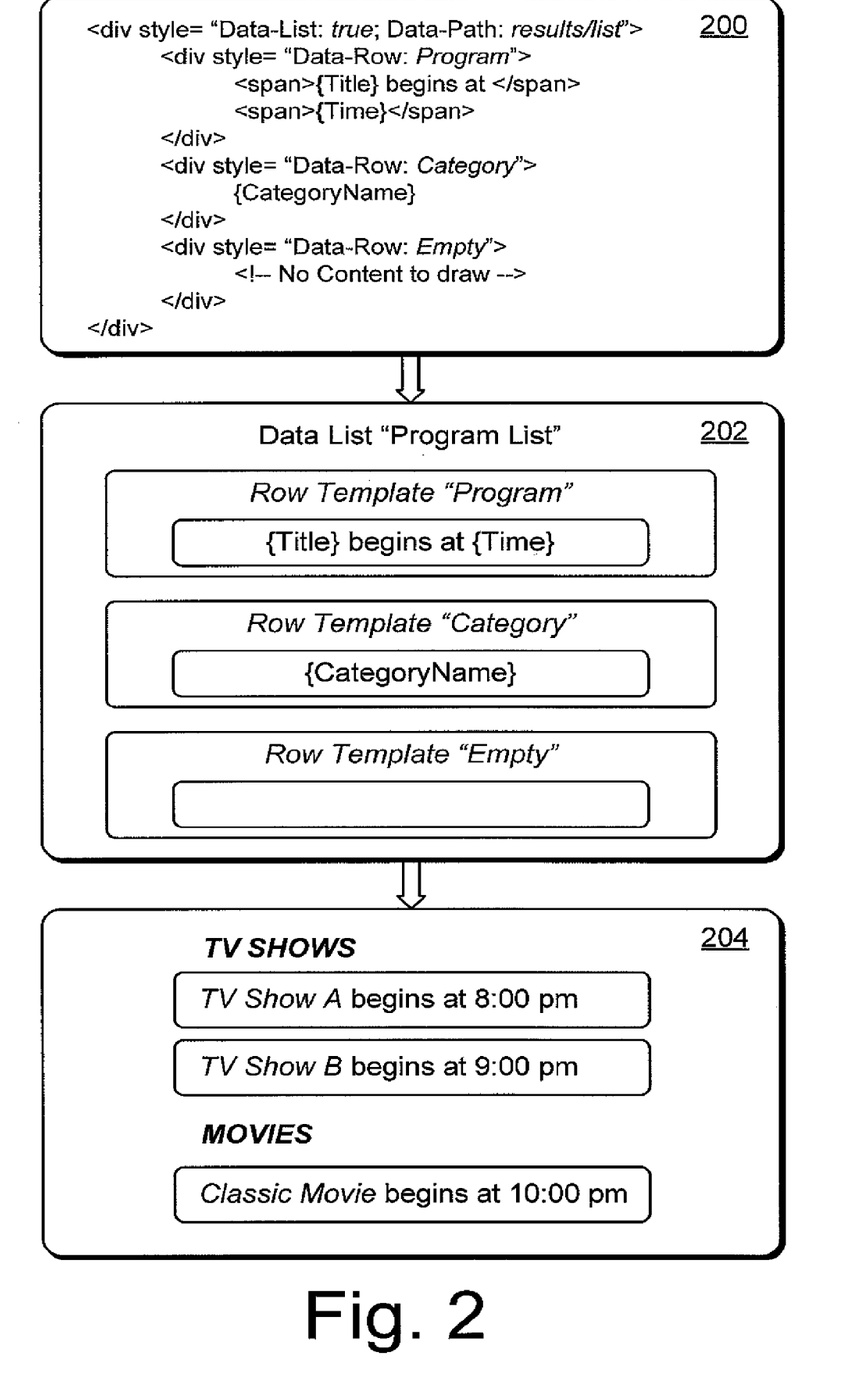
FIG. 2 illustrates authored markup content, a logical representation of the markup content, and a presentation at a client device in an example of dynamic data presentation.

FIG. 2 illustrates an example of markup content 200 for a program list in a television-based program guide, a logical representation 202 of the elements and the markup content 200, and an example presentation 204 rendered at a television-based client device 102 from the markup content 200, logical representation 202, and template(s) 130. Markup content 200 is an example of part of the authored content received from a content provider 104 in standard, simplified HTML. This example markup content 200 generates the display of the logical representation 202 which includes the "Title" and the "Time" of program elements, as well as the "Name" of any category elements in the example program list. In other examples, markup content can be received from a news service for various news stories and headlines that bind to template(s) for the news service layout at the client device.

In this example, the markup content 200 includes references to three different templates 130: "Data-Row: Program", "Data-Row: Category", and "Data-Row: Empty". An example of a representative data set that can be received at a client device 102 from a content provider 104 follows, and is an XML representation of the data, although implementations of dynamic data presentation allow for any type or hierarchical representation of the data.

A representative data set would be:

```

<list>
    <category>
      <name>TV Shows</name>
    </category>
    <program>
      <title>TV Show A</title>
```

-continued

```
<time>8:00 pm</time>
<channel>261</channel>
</program>
<program>
<title>TV Show B</title>
<time>9:00 pm</time>
<channel>314</channel>
</program>
<empty>
</empty>
<category>
<name>Movies</name>
</category>
<program>
<title>Classic Movie</title>
<time>10:00 pm</time>
<channel>257</channel>
</program>
</list>

```

At the content provider 104, content that is requested by a client device 102 is loaded by a browser application which is used to analyze the document layout. When the <div> with style property "Data-List" set to "true" is encountered in the markup content 200, a list-box drawing command is appended to the list of commands. When the <div> with style property "Data-Row" set to "Program" is encountered, a state is entered where all operations are saved into another list of "program" commands. After the scope of the "Program"<div> ends (at the </div> end tag), the opening tag of the <div style="Data-Row: Category"> signals the beginning of the scope of a "Category" template. All of the drawing commands encountered while in the scope of the "Category" div are stored in a "Category" list.

When the processing of the document is completed at the content provider 104, a drawing subroutine is generated that includes the drawing operations. A separate row-drawing subroutine can be created using the captured "Program" and "Category" drawing commands, and instructions can call this row-drawing subroutine when an item is to be displayed, passing as a parameter to that function a reference to the data for that item.

The client device 102 can then select which template to render the dynamic data at runtime depending on the type of the data received. For example, if a category at a child node of the data path is determined, then the content rendering system 124 selects the category template in which to display the category data. Similarly, if a program at a child node of the data path is determined, then the content rendering system 124 selects the program template in which to display the program data. An empty node specifies a blank space in the data. The "Program" and "Category" template elements are merely exemplary for the purposes of this description, and can be implemented as any named template for any type presentation at a resource-constrained computing-based client device.

The example presentation 204 rendered at a television-based client device 102 from the markup content 200, logical representation 202, and template(s) 130 is displayed for a viewer to indicate when television shows and a movie begins. The header rows "TV Shows" and "Movies" are records in the content received from the content provider 104, and the dynamic data includes a list of data items that is a scrollable list of program listings for the "TV Shows" and the "Movies". When the viewer initiates a program guide navigation input, the client device 102 communicates the request to the content provider 104 and receives additional dynamic data to update the program listings for the "TV Shows" and the "Movies". Only the dynamic data for the program listings is communicated to the client device 102 to update the presentation 204, yet the presentation is rendered as if the markup for the content was provided. The dynamic content areas of the presentation 204 are replaced at runtime using the templates where the presentation framework is defined by the templates 130.

A content provider 104 can also generate a set of drawing instructions that, when processed at the client device 102, generate a template to render a presentation based on the type of data being rendered. The content rendering system 124 of a client device 102 selects a set of drawing instructions to render a presentation layout within which the dynamic data is displayed. As described above, a resource-constrained computing-based client device can process the drawing instructions without a markup language-based application to render the layout within which the dynamic data is displayed. When the client device 102 requests an update of the dynamic data for display, the content provider 104 can communicate additional dynamic data to the client device 102 without again having to transcode the presentation layout.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, examples of which are described with reference to the exemplary client device 700 shown in FIG. 7. Further, the features of dynamic data presentation as described herein are platform-independent such that the techniques may be implemented on a variety of commercial computing platforms having a variety of processors.

Methods for dynamic data presentation, such as exemplary methods 300, 400, and 500 described with reference to respective FIGS. 3, 4, and 5, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
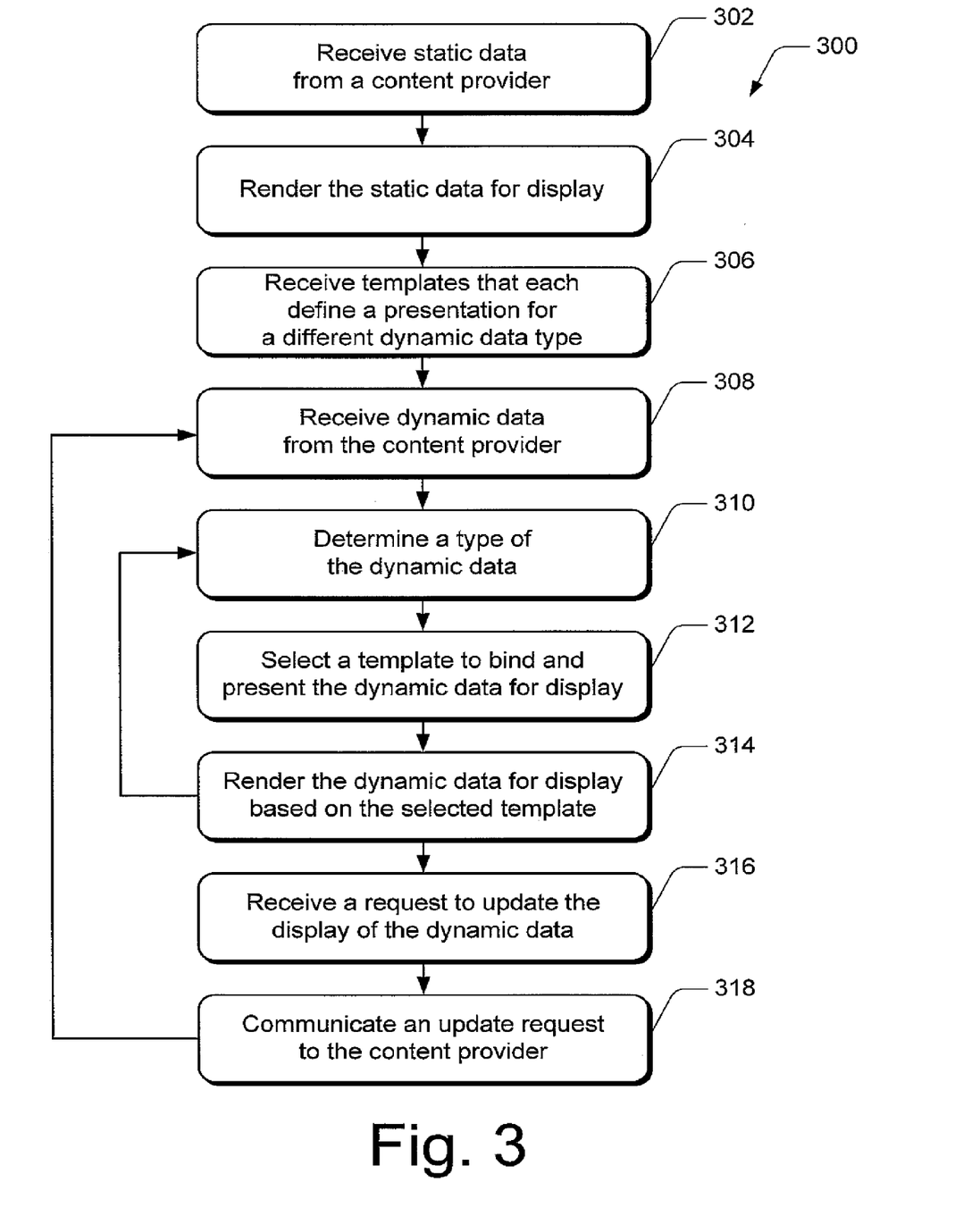
FIG. 3 illustrates exemplary method(s) for dynamic data presentation.

FIG. 3 illustrates an exemplary method 300 for dynamic data presentation and is described with reference to the exemplary environment 100 shown in FIG. 1. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, static data is received from a content provider, and at block 304, the static data is rendered for display. For example, client device 102 (FIG. 1) receives static data 126 from content provider(s) 104, and in the example of a television-based client device 108, the static data 126 is rendered for display on display device 134. At block 306, templates are received that each defines a presentation for a different dynamic data type. For example, the client device 102 receives template(s) 130 and/or drawing instructions from content provider 104.

At block 308, dynamic data is received from the content provider, and at block 310, a type of the dynamic data is determined. For example, client device 102 receives dynamic data 128 from the content provider 104, and the content rendering system 124 determines a display type of the dynamic data. At block 312, a template is selected to bind and present the dynamic data for display. For example, the content rendering system 124 at the client device 102 selects a template 130 and/or drawing instructions 132 based on the determined type of the dynamic data.

At block 314, the dynamic data is rendered for display based on the selected template. For example, the content rendering system 124 renders the dynamic data 128 for display within the selected template(s), and in the example of a television-based client device 108, the dynamic data 128 is rendered for display on display device 134. For dynamic data received at the client device 102 that invokes more than one template 130, the method 300 can continue at block 310 to again determine a different type of the dynamic data in the received content, select a different template at block 312 to bind and present the different dynamic data for display, and render the different dynamic data for display at block 314 based on the selected different template.

At block 316, a request is received to update the display of the dynamic data. For example, the client device 102 can receive a viewer or user-selectable input to initiate an update of the dynamic data in a display, such as the program listings shown in a grid of an electronic program guide, or the text for a subsequent email message shown in an email application template.

At block 318, an update request is communicated to the content provider. For example, the client device communicates a dynamic data update request to the content provider 104 which provides the requested additional dynamic data to update the data display. The method 300 then continues at block 308 to receive the additional dynamic data from the content provider. The additional dynamic data is received from the content provider without the need to receive an additional template to bind and present the additional dynamic data.

The method 300 again continues at block 310 to determine a type of the additional dynamic data, and at block 312, a different template and/or drawing instructions are selected to bind and present the additional dynamic data for display. At block 314, the additional dynamic data is rendered for display based on the selected different template. In an embodiment of dynamic data presentation, the additional dynamic data is displayed along with the dynamic data in the display where each type of dynamic data is rendered for displayed based on the different templates.

Figure 4:
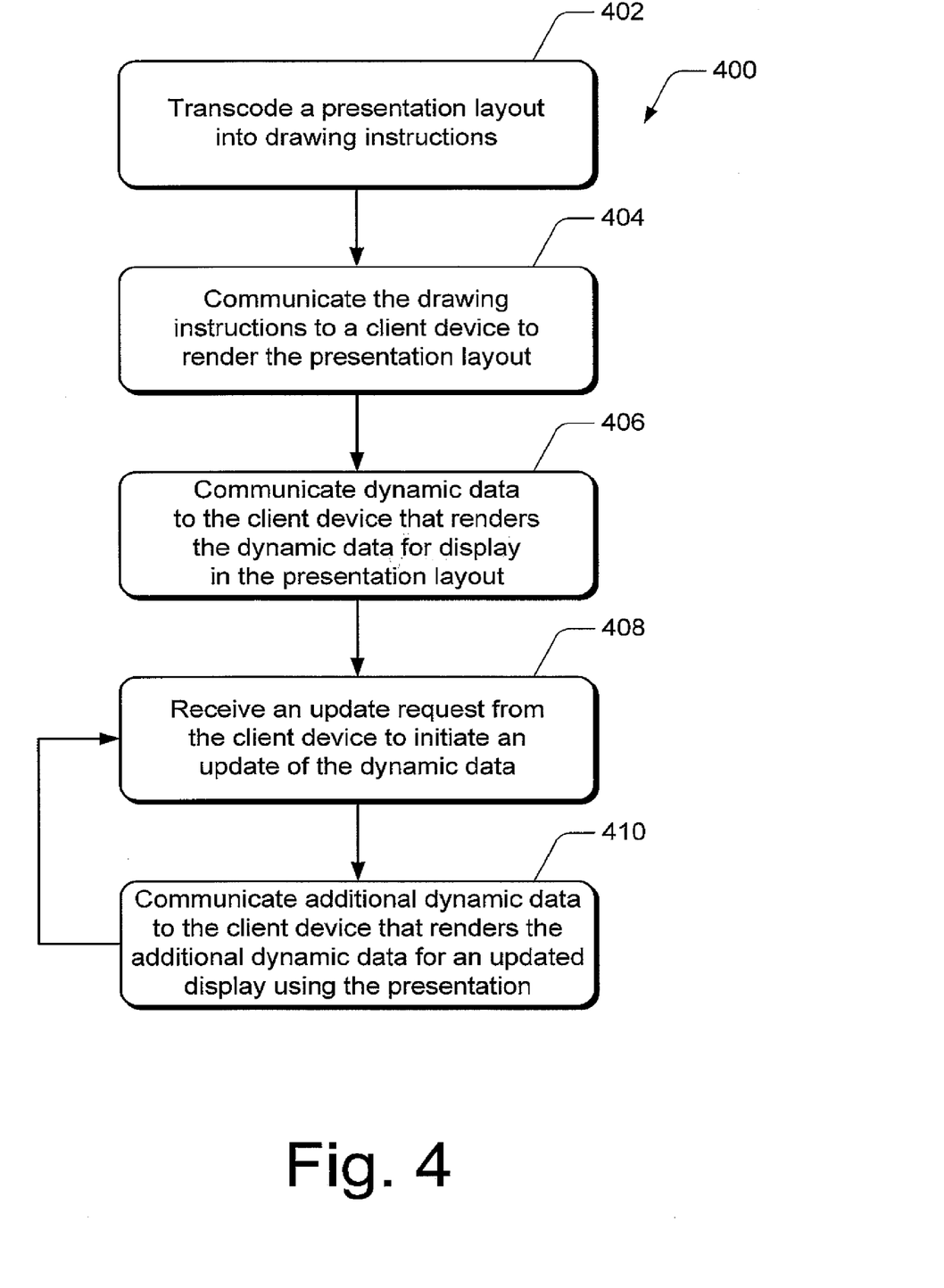
FIG. 4 illustrates exemplary method(s) for dynamic data presentation.

FIG. 4 illustrates an exemplary method 400 for dynamic data presentation and is described with reference to the exemplary environment 100 shown in FIG. 1. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 402, a presentation layout is transcoded into drawing instructions. For example, a content provider 104 (FIG. 1) transcodes a page or presentation layout generated in a markup language into drawing instructions. At block 404, the drawing instructions are communicated to a client device that processes the drawing instructions to render the presentation layout for display. For example, a client device 102 receives the drawing instructions from the content provider 104 and processes the drawing instructions to render a presentation layout. In the example of a resource-constrained computing-based client device, the client device can process the drawing instructions without a markup language-based application to render the presentation layout.

At block 406, dynamic data is communicated to the client device that renders the dynamic data for display using the presentation layout. For example, the content provider 104 downloads or communicates the dynamic data 128 to the client device. At block 408, an update request is received from the client device to initiate an update of the dynamic data displayed at the client device. For example, the client device 102 can receive a viewer or user-selectable input to initiate an update of the dynamic data in a display, and the content provider 104 receives an update request from the client device 102.

At block 410, additional dynamic data is communicated to the client device that renders the additional dynamic data for display using the presentation layout to update the dynamic data. For example, the content provider 104 downloads or communicates the additional dynamic data to the client device 102 without having to re-transcode the presentation layout. The method 400 can then continue at block 408 to receive additional update requests from the client device 102, and continue at block 410 to communicate additional dynamic data to the client device.

Figure 5:
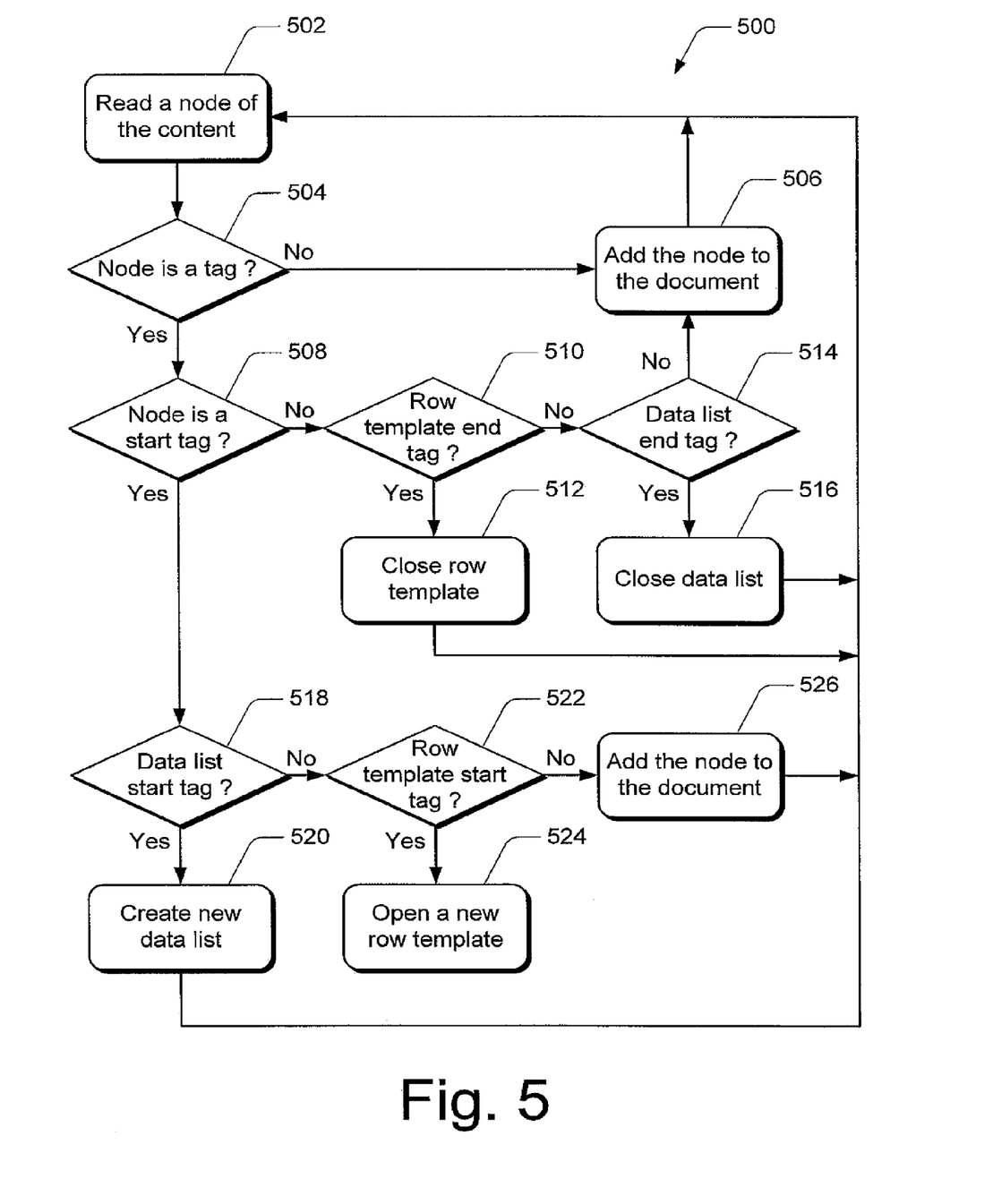
FIG. 5 illustrates exemplary method(s) for dynamic data presentation.

FIG. 5 illustrates an exemplary method 500 for dynamic data presentation and is described with reference to a server-side process to capture drawing procedures for templates from any styleable markup content. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 502, a node of the content is read at a content provider. For example, a server at a content provider 104 is implemented to read a node of the content in the server-side process to create a document that specifies row templates for data-binding. At block 504, a determination is made as to whether the node is a tag. If the node is not a tag (i.e., "no" from block 504), then the node is added to the document that is being created at block 506 and the method 500 continues at block 502 to read a subsequent node of the content. If the node is a tag (i.e., "yes" from block 504), then a determination is made as to whether the node is a start tag at block 508.

If the node is not a start tag (i.e., "no" from block 508), then a determination is made as to whether the node is a row template end tag at block 510. If the node is a row template end tag (i.e., "yes" from block 510), then the row template is closed at block 512 and the method 500 continues at block 502 to read a subsequent node of the content. If the node is not a row template end tag (i.e., "no" from block 510), then a determination is made as to whether the node is a data list end tag at block 514. If the node is a data list end tag (i.e., "yes" from block 514), then the data list is closed at block 516 and the rest of the document is continued to be processed. If the node is not a data list end tag (i.e., "no" from block 514), then the node is added to the document that is being created at block 506 and the method 500 continues at block 502 to read a subsequent node of the content.

If the node is a start tag (i.e., "yes" from block 508), then a determination is made as to whether the node is a data list start tag at block 518. If the node is a data list start tag (i.e., "yes" from block 518), then a new data list is created at block 520 and the method 500 continues at block 502 to read a subsequent node of the content. If the node is not a data list start tag (i.e., "no" from block 518), then a determination is made as to whether the node is a row template start tag for a new template at block 522. If the node is a row template start tag for a new template (i.e., "yes" from block 522), then a new row template is opened at block 524 and the method 500 continues at block 502 to read a subsequent node of the content. If the node is not a row template start tag for a new template (i.e., "no" from block 522), then the node is added to the document that is being created at block 526 and the method 500 continues at block 502 to read a subsequent node of the content.

Figure 6:
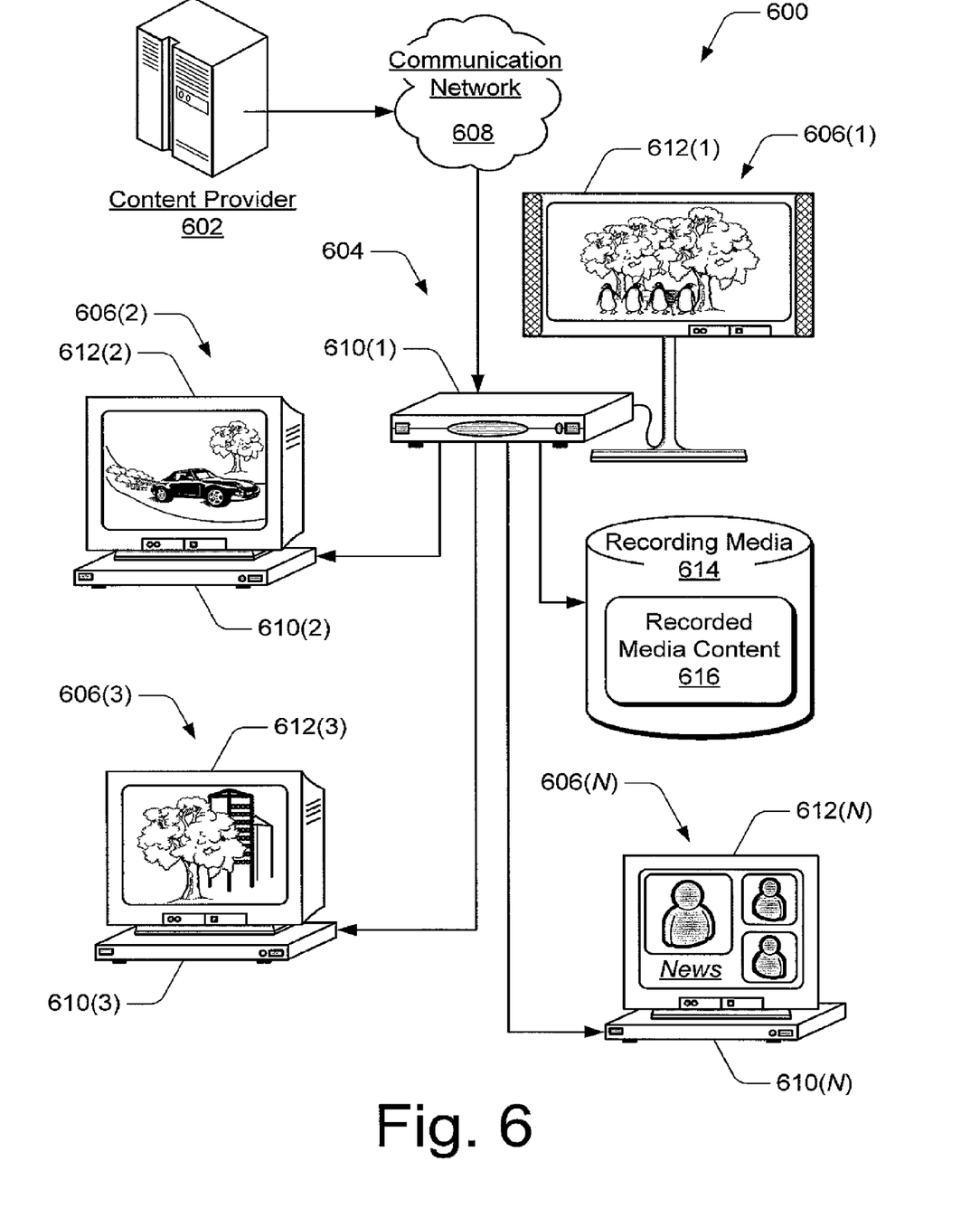
FIG. 6 illustrates an exemplary IP-based television (IPTV) system in which embodiments of dynamic data presentation can be implemented.

FIG. 6 illustrates an exemplary IP-based television (IPTV) environment 600 in which embodiments of dynamic data presentation can be implemented. The IPTV environment 600 includes a content provider 602 and a viewing system 604 that can include any number of television-based client systems 606. A client system 606(1) is configured for communication with the content provider 602 via a communication network 608 which, in this example, is an IP-based network. In addition to the client system 606(1), the viewing system 604 includes television-based client systems 606(2-N), and can represent a household viewing system that has several viewing areas, such as different rooms, for viewing television programming.

Television-based programs may include any form of programs, commercials, music, movies, video on-demand movies and other media content, recorded media content, interactive games, network-based applications, and any other similar audio, video, and/or image content. In addition, programming in general may include music streamed from a computing device to a client device, such as a television-based set-top box, and may also include video on-demand media content delivered from a server, a photo slideshow, and any other audio, video, and/or image content received from any type of media content source.

The television-based client systems 606(1-N) may be implemented with any number and combination of differing components as further described below with reference to the exemplary client device 700 shown in FIG. 7. Further, the IPTV environment 600 may be implemented with any number and combination of differing components as described below with reference to the exemplary entertainment and information system 800 shown in FIG. 8.

The television-based client system 606(1) includes a client device 610(1) and a display device 612(1), such as any type of television, monitor, LCD, or similar television-based display system that renders audio, video, and/or image data. Similarly, the television-based client systems 606(2-N) each include a respective client device 610(2-N) and a respective display device 612(2-N). Each client device 610 can be implemented in any number of embodiments, such as a television-based set-top box, a digital video recorder (DVR) and playback system, an appliance device, a gaming system, and as any other type of client device that may be implemented in a television-based entertainment and information system.

Client device 610(1) receives program content from content provider 602 via the communication network 608. In the example viewing system 604, client device 610(1) is a master client device that receives one or more data streams from content provider 602 and then arbitrates stream allocation to distribute the data streams, one each, to one or more of the other satellite client devices 610(2-N). The satellite client devices 610(2-N) connect to the master client device 610(1) to receive a data stream for live television, delayed program viewing, and/or recorded DVR playback. The data streams are allocated by the content provider 602 to the viewing system 604 (e.g., a household), and the data streams can be any combination of high definition and/or standard definition television data streams.

Although the data streams are not shown specifically, the arrowed communication links illustrate various data communication links which include the data streams. Additionally, the arrowed communication links are not intended to be interpreted as a one-way communication link from client device 610(1) to client device 610(2), for example. It is contemplated that any one or more of the arrowed communication links can facilitate two-way data communication, such as from client device 610(2) to client device 610(1) for example, and from client device 610(1) to content provider 602.

In this system, the master client device 610(1) receives four (4) data streams from the content provider 602 via the communication network 608. A viewing selection from a first data stream is shown for viewing on display device 612(1) at the television-based client system 606(1). A second data stream is directed from the master client device 610(1) to the television-based client system 606(2) and a viewing selection from a second data stream is shown for viewing on display device 612(2). Similarly, a third data stream is directed from the master client device 610(1) to the television-based client system 606(3) and a viewing selection from the third data stream is shown for viewing on display device 612(3). Additionally, a fourth data stream is directed from the master client device 610(1) to the television-based client system 606(4) and a viewing selection from the fourth data stream is shown for viewing on display device 612(4).

The viewing system 604 also includes recording media 614 which can be implemented as a DVR system to record and maintain media content 616, such as any form of programs, movies, and similar audio, video, and/or image content that may be distributed or otherwise received from content provider 602. In one embodiment, the recording media can be implemented as an independent component of the viewing system 604 and connected to the master client device 610(1). Alternatively, the recording media 614 can be implemented as a component of the master client device 610(1) which manages recordings initiated from any of the other satellite client devices 610(2-N). In yet another embodiment, the recording media 614 may be a distributed recording system where any one or more of the client devices 610(1-N) include recording media that is centrally managed by the master client device 610(1).

Figure 7:
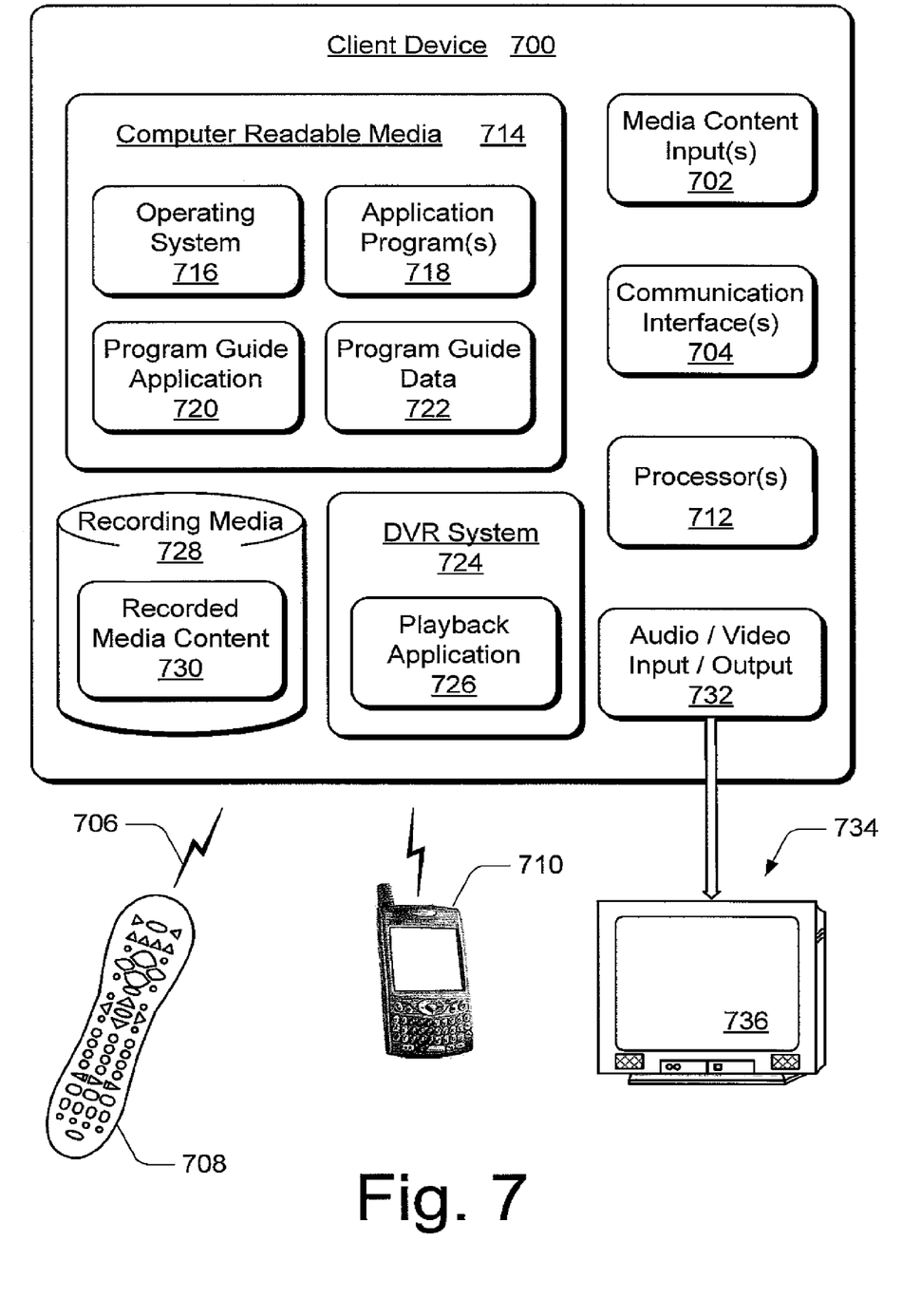
FIG. 7 illustrates various components of an exemplary client device in which embodiments of dynamic data presentation can be implemented.

FIG. 7 illustrates various components of an exemplary client device 700 which can be implemented as any form of a computing, electronic, or television-based client device, and/or as any type of resource-constrained computing-based client device in which embodiments of dynamic data presentation can be implemented. For example, the client device 700 can be implemented as a television-based client device 108, as any other of the client device examples shown in FIG. 1, and/or as any one of the television-based client devices 610(1-N) shown in FIG. 6 as part of the viewing system 604.

Client device 700 includes one or more media content inputs 702 which may include Internet Protocol (IP) inputs over which streams of media content are received via an IP-based network. Device 700 further includes communication interface(s) 704 which can be implemented as any one or more of a serial and/or parallel interface, a wireless interface, any type of network interface, a modem, and as any other type of communication interface. A wireless interface enables client device 700 to receive control input commands 706 and other information from an input device, such as from remote control device 708, a portable computing-based device (such as a cellular phone) 710, or from another infrared (IR), 802.11, Bluetooth, or similar R-F input device.

A network interface provides a connection between the client device 700 and a communication network by which other electronic and computing devices can communicate data with device 700. Similarly, a serial and/or parallel interface provides for data communication directly between client device 700 and the other electronic or computing devices. A modem facilitates client device 700 communication with other electronic and computing devices via a conventional telephone line, a DSL connection, cable, and/or other type of connection.

Client device 700 also includes one or more processors 712 (e.g., any of microprocessors, controllers, and the like) which process various computer executable instructions to control the operation of device 700, to communicate with other electronic and computing devices, and to implement embodiments of dynamic data presentation. Client device 700 can be implemented with computer readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 714 provides data storage mechanisms to store various information and/or data such as software applications and any other types of information and data related to operational aspects of client device 700. For example, an operating system 716 and/or other application programs 718 can be maintained as software applications with the computer readable media 714 and executed on processor(s) 712 to implement embodiments of dynamic data presentation.

For example, client device 700 can be implemented to include a program guide application 720 that is implemented to process program guide data 722 and generate program guides for display which enable a viewer to navigate through an onscreen display and locate broadcast programs, recorded programs, video on-demand programs and movies, interactive game selections, network-based applications, and other media access information or content of interest to the viewer.

The client device 700 can also include a DVR system 724 with playback application 726, and recording media 728 to maintain recorded media content 730 which may be any form of on-demand and/or broadcast media content 220 such as programs, movies, commercials, music, and similar audio, video, and/or image content that client device 700 receives and/or records. Further, client device 700 may access or receive additional recorded media content that is maintained with a remote data store (not shown), such as from a video-on-demand server, or media content that is maintained at a broadcast center or content provider that distributes the media content to subscriber sites and client devices. The playback application 726 is a video control application that can be implemented to control the playback of media content, the recorded media content 730, and or other video on-demand media content, music, and any other audio, video, and/or image media content which can be rendered and/or displayed for viewing.

The client device 700 also includes an audio and/or video output 732 that provides audio and video to an audio rendering and/or display system 734, or to other devices that process, display, and/or otherwise render audio, video, and image data. Video signals and audio signals can be communicated from device 700 to a display device 736 via an RF (radio frequency) link, S-video link, composite video link, component video link, analog audio connection, or other similar communication link. Alternatively, the audio rendering and/or display system 734 is/are integrated components of the exemplary client device 700.

Figure 8:
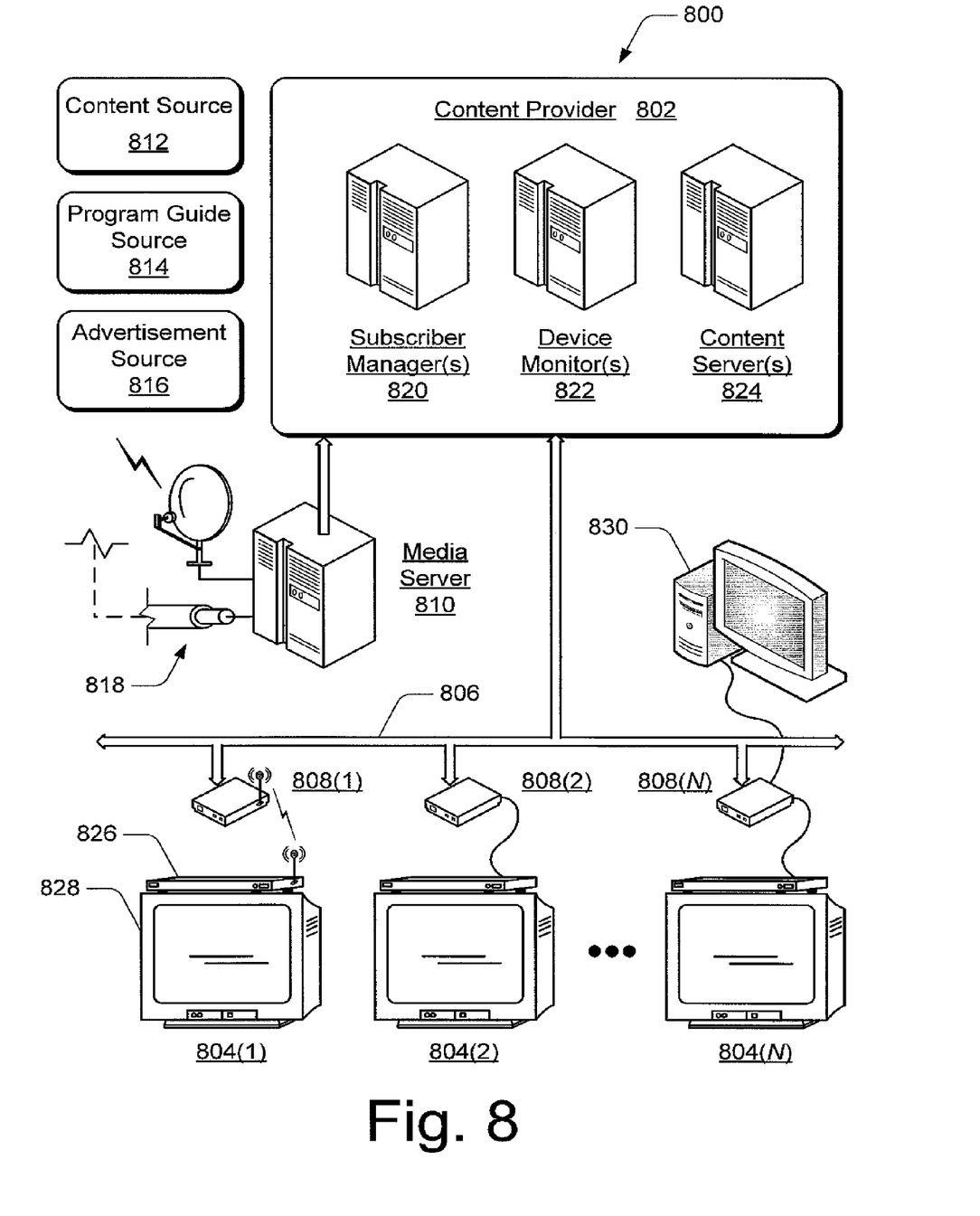
FIG. 8 illustrates various devices and components in an exemplary entertainment and information system in which embodiments of dynamic data presentation can be implemented.

FIG. 8 illustrates an exemplary entertainment and information system 800 in which an IP-based television environment can be implemented, and in which embodiments of dynamic data presentation can be implemented. System 800 facilitates the distribution of program content, program guide data, and advertising content to multiple viewers and to multiple viewing systems. System 800 includes a content provider 802 and television-based client systems 804(1-N) each configured for communication via an IP-based network 806. Each television-based client system 804(1-N) is an example of the television-based client system 606(1) described with reference to FIG. 6. Each of the television-based client systems 804(1-N) can receive one or more data streams from content provider 802 and then arbitrate stream allocation to distribute the data streams, one each, to one or more other satellite client devices in a viewing system.

The network 806 can be implemented as a wide area network (e.g., the Internet), an intranet, a Digital Subscriber Line (DSL) network infrastructure, or as a point-to-point coupling infrastructure. Additionally, network 806 can be implemented using any type of network topology and any network communication protocol, and can be represented or otherwise implemented as a combination of two or more networks. A digital network can include various hardwired and/or wireless links 808(1-N), routers, gateways, and so on to facilitate communication between content provider 802 and the client systems 804(1-N). The television-based client systems 804(1-N) receive program content, program guide data, advertising content, closed captions data, and the like from content server(s) of the content provider 802 via the IP-based network 806.

System 800 includes a media server 810 that receives program content from a content source 812, program guide data from a program guide source 814, and advertising content from an advertisement source 816. In an embodiment, the media server 810 represents an acquisition server that receives the audio and video program content from content source 812, an EPG server that receives the program guide data from program guide source 814, and/or an advertising management server that receives the advertising content from the advertisement source 816.

The content source 812, the program guide source 814, and the advertisement source 816 control distribution of the program content, the program guide data, and the advertising content to the media server 810 and/or to other television-based servers. The program content, program guide data, and advertising content is distributed via various transmission media 818, such as satellite transmission, radio frequency transmission, cable transmission, and/or via any number of other wired or wireless transmission media. In this example, media server 810 is shown as an independent component of system 800 that communicates the program content, program guide data, and advertising content to content provider 802. In an alternate implementation, media server 810 can be implemented as a component of content provider 802.

Content provider 802 is representative of a headend service in a television-based content distribution system, for example, that provides the program content, program guide data, and advertising content to multiple subscribers (e.g., the television-based client systems 804(1-N)). The content provider 802 can be implemented as a satellite operator, a network television operator, a cable operator, and the like to control distribution of program and advertising content, such as movies, television programs, commercials, music, and other audio, video, and/or image content to the client systems 804(1-N).

Content provider 802 includes various components to facilitate media data processing and content distribution, such as a subscriber manager 820, a device monitor 822, and a content server 824. The subscriber manager 820 manages subscriber data, and the device monitor 822 monitors the client systems 804(1-N) (e.g., and the subscribers), and maintains monitored client state information.

Although the various managers, servers, and monitors of content provider 802 (to include the media server 810 in one embodiment) are illustrated and described as distributed, independent components of content provider 802, any one or more of the managers, servers, and monitors can be implemented together as a multi-functional component of content provider 802. Additionally, any one or more of the managers, servers, and monitors described with reference to system 800 can implement features and embodiments of dynamic data presentation.

The television-based client systems 804(1-N) can be implemented to include a client device 826 and a display device 828 (e.g., a television, LCD, and the like). A client device 826 of a television-based client system 804 can be implemented in any number of embodiments, such as a set-top box, a digital video recorder (DVR) and playback system, an appliance device, a gaming system, and as any other type of client device that may be implemented in a television-based entertainment and information system. In an alternate embodiment, client system 804(N) is implemented with a computing device 830 as well as a client device 826. Additionally, any of the client devices 826 of a client system 804 can implement features and embodiments of dynamic data presentation as described herein.

Although embodiments of dynamic data presentation have been described in language specific to structural features and/or methods, it is to be understood that the subject of the appended claims is not necessarily limited to the specific features or methods described. Rather, the specific features and methods are disclosed as exemplary implementations of dynamic data presentation.

What is claimed is:

1. A method, comprising:
    transcoding a presentation layout into drawing instructions;
    communicating the drawing instructions to a client device that processes the drawing instructions to render the presentation layout in which dynamic data can be displayed;
    communicating the dynamic data to the client device that renders the dynamic data for display in the presentation layout;
    receiving an update request from the client device to initiate an update of the dynamic data; and
    communicating additional dynamic data to the client device that renders the additional dynamic data for display in the presentation layout to update the dynamic data;
    wherein transcoding the presentation layout into the drawing instructions includes generating a template of the drawing instructions using a markup language; and wherein,
    communicating the drawing instructions includes communicating the drawing instructions to the client device that processes the drawing instructions without a markup language-based application to render the presentation layout for display.

2. A method as recited in claim 1, wherein communicating the additional dynamic data to the client device includes communicating the additional dynamic data without having to re transcode the presentation layout.

3. A method as recited in claim 1, wherein transcoding the presentation layout into the drawing instructions includes generating one or more templates of the drawing instructions using a markup language, and generating the one or more templates for different data types.

4. A method as recited in claim 1, wherein transcoding the display presentation includes transcoding the presentation layout into a drawing instructions template that the client device can initiate to render the presentation layout.

5. A method as recited in claim 1, further comprising:
    communicating one or more templates to the client device, the templates each defining a presentation for a different dynamic data type; and
    communicating different dynamic data to the client device which determines the type of the different dynamic data, selects a template to bind and present the different dynamic data for display, and renders the different dynamic data for display based on the selected template.

6. A system, comprising:
    a computing based client device configured to maintain templates that each defines a presentation for a different dynamic data type;
    a content rendering system of the computing-based client device configured to:
    receive dynamic data;
    determine a type of the dynamic data;
    select a template to bind and present the dynamic data for display, the template being selected based on the determined type of the dynamic data; and
    render the dynamic data for display based on the selected template; wherein:
    the computing-based client device is further configured to maintain a set of drawing instructions to generate a presentation for the dynamic data; and wherein,
    the content rendering system is further configured to select and initiate processing the set of drawing instructions to render the presentation within which the dynamic data is displayed; and
    wherein the system further comprises a content provider configured to:
    transcode the presentation into the set of drawing instructions;
    communicate the set of drawing instructions to the computing-based client device;
    receive an update request from the client device to initiate an update of the dynamic data;
    communicate additional dynamic data to the computing-based client device without having to re transcode the presentation; and wherein,
    the computing-based client device is further configured to render the additional dynamic data for display within the presentation
    wherein:
    the presentation is a page layout generated in markup language which the content provider is further configured to transcode into the drawing instructions and communicate to the computing-based client device; and wherein, the content rendering system is further configured to process the drawing instructions without a markup language based application to render the layout within which the dynamic data is displayed.

7. A system as recited in claim 6, wherein the computing-based client device is further configured to initiate an update of the dynamic data, and wherein the content rendering system is further configured to:
   receive additional dynamic data without receiving an additional template to bind and present the additional dynamic data; and
   render the additional dynamic data for display based on the selected template.

8. A system as recited in claim 6, wherein the content rendering system is further configured to:
   receive additional dynamic data without receiving an additional template to bind and present the additional dynamic data;
   determine a type of the additional dynamic data;
   select a different template to bind and present the additional dynamic data for display, the different template being selected based on the determined type of the additional dynamic data; and
   render the additional dynamic data for display based on the selected different template.

9. A system as recited in claim 6, wherein the computing-based client device is a resource constrained client device having at least one of: limited processing capability; limited memory resources; limited network bandwidth availability.

10. One or more processor-accessible media comprising processor-executable instructions that, when executed, direct a device to perform actions comprising:
    transcoding a presentation layout into drawing instructions;
    communicating the drawing instructions to a client device that processes the drawing instructions to render the presentation layout in which dynamic data can be displayed;
    communicating the dynamic data to the client device that renders the dynamic data for display in the presentation layout;
    receiving an update request from the client device to initiate an update of the dynamic data; and
    communicating additional dynamic data to the client device that renders the additional dynamic data for display in the presentation layout to update the dynamic data;
    wherein transcoding the presentation layout into the drawing instructions includes generating a template of the drawing instructions using a markup language; and wherein,
    communicating the drawing instructions includes communicating the drawing instructions to the client device that processes the drawing instructions without a markup language-based application to render the presentation layout for display.

11. The one or more processor-accessible media as recited in claim 10, wherein communicating the additional dynamic data to the client device includes communicating the additional dynamic data without having to re transcode the presentation layout.

12. The one or more processor-accessible media as recited in claim 10, wherein transcoding the presentation layout into the drawing instructions includes generating one or more templates of the drawing instructions using a markup language, and generating the one or more templates for different data types.

13. The one or more processor-accessible media as recited in claim 10, wherein transcoding the display presentation includes transcoding the presentation layout into a drawing instructions template that the client device can initiate to render the presentation layout.

14. The one or more processor-accessible media as recited in claim 10, further comprising:
    communicating one or more templates to the client device, the templates each defining a presentation for a different dynamic data type; and
    communicating different dynamic data to the client device which determines the type of the different dynamic data, selects a template to bind and present the different dynamic data for display, and renders the different dynamic data for display based on the selected template.

* * * * *